United States Patent
Luo et al.

(10) Patent No.: US 12,445,001 B2
(45) Date of Patent: Oct. 14, 2025

(54) ROTOR, MOTOR, AND ELECTRIC PRODUCT

(71) Applicant: Nidec Corporation, Kyoto (JP)

(72) Inventors: Ta-Yin Luo, Taipei (TW); Yu-Wei Hsu, Taipei (TW); Sheng-Chan Yen, Taipei (TW); Pei-Chun Shih, Taipei (TW); Hsin-Nan Lin, Taipei (TW); Guo-Jhih Yan, Taipei (TW); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 364 days.

(21) Appl. No.: 17/925,592

(22) PCT Filed: Apr. 26, 2021

(86) PCT No.: PCT/JP2021/016583
§ 371 (c)(1),
(2) Date: Nov. 15, 2022

(87) PCT Pub. No.: WO2021/230056
PCT Pub. Date: Nov. 18, 2021

(65) Prior Publication Data
US 2023/0198323 A1    Jun. 22, 2023

(30) Foreign Application Priority Data

May 15, 2020    (CN) ........................ 202010415194.7

(51) Int. Cl.
*H02K 1/24*    (2006.01)
*H02K 19/10*    (2006.01)

(52) U.S. Cl.
CPC ........... *H02K 1/246* (2013.01); *H02K 19/103* (2013.01); *H02K 2213/03* (2013.01)

(58) Field of Classification Search
CPC ............ H02K 1/02; H02K 1/24; H02K 1/246; H02K 1/276; H02K 1/2766; H02K 15/02;
(Continued)

(56) References Cited

U.S. PATENT DOCUMENTS 6,259,181 B1 *    7/2001  Kawano ................ H02K 1/246
                                         310/216.059
2003/0020351 A1 *  1/2003  Lee ....................... H02K 15/022
                                         29/598
(Continued)

FOREIGN PATENT DOCUMENTS

JP    2017-050918 A    3/2017
JP    2017-208910 A    11/2017
(Continued)

OTHER PUBLICATIONS

17925592_2025-06-09_KR_20130080635_A_H.pdf (Year: 2025).*
Official Communication issued in International Patent Application No. PCT/JP2021/016583, mailed on Jun. 29, 2021.

*Primary Examiner* — Christopher M Koehler
*Assistant Examiner* — Ahmed F Seck
(74) *Attorney, Agent, or Firm* — Keating & Bennett, LLP

(57) ABSTRACT

A motor includes a rotor and a stator, the rotor includes flux barriers. In a plane orthogonal to an axial direction, at least two flux barriers corresponding to each pole of the rotor are located entirely within an extending angle. A magnitude of the extending angle is determined by a number of poles of the rotor and phases of the motor. A center line of the extending angle is a q-axis of the rotor. A ratio between an area of the flux barrier entirely located within the extending angle and an area of all flux barriers corresponding to the pole is about ½ or more, and a ratio between an area of a radially innermost flux barrier entirely located within the extending angle and an area of a radially outermost flux (Continued)

barrier entirely located within the extending angle and a smaller one of the two areas is about 10% or less.

16 Claims, 3 Drawing Sheets

(58) Field of Classification Search
CPC ...... H02K 15/023; H02K 15/03; H02K 19/02; H02K 19/103; H02K 29/03; H02K 2213/03
See application file for complete search history.

(56) References Cited

U.S. PATENT DOCUMENTS

| | | | |
|---|---|---|---|
| 2017/0338702 | A1 | 11/2017 | Yokochi |
| 2018/0226848 | A1* | 8/2018 | Kolehmainen ........ H02K 19/14 |
| 2018/0301948 | A1* | 10/2018 | Hsu ...................... H02K 15/02 |
| 2019/0165623 | A1* | 5/2019 | Yen ..................... H02K 19/103 |
| 2019/0173336 | A1 | 6/2019 | Takeuchi et al. |
| 2019/0348874 | A1* | 11/2019 | Yen ..................... H02K 19/103 |
| 2021/0296948 | A1 | 9/2021 | Yen et al. |

FOREIGN PATENT DOCUMENTS

| | | | | |
|---|---|---|---|---|
| JP | 2020-501500 | A | | 1/2020 |
| KR | 20130080635 | A * | 7/2013 | ........... H02K 19/103 |
| WO | 2018/043081 | A1 | | 3/2018 |
| WO | 2020/032077 | A1 | | 2/2020 |

* cited by examiner

ROTOR, MOTOR, AND ELECTRIC PRODUCT

CROSS REFERENCE TO RELATED APPLICATIONS

This is a U.S. national stage of PCT Application No. PCT/JP2021/016583, filed on Apr. 26, 2021, with priority under 35 U.S.C. § 119(a) and 35 U.S.C. § 365(b) being claimed from Chinese Application No. 202010415195, filed May 15, 2020, the entire disclosures of which are hereby incorporated herein by reference.

1. FIELD OF THE INVENTION

The present application relates to the field of electric machines, and in particular, to a rotor, a motor, and an electric product.

2. BACKGROUND

Motors are widely used in various electric products and electric machine facilities. There are various types of motors, including induction motors, synchronous reluctance motors, and the like.

In recent years, synchronous reluctance motors have been rapidly developed, and, for example, an aluminum die-cast type synchronous reluctance motor (Line Start SynRM) activated by connection of a direct current power line has been increasingly attracting attention. In such a synchronous reluctance motor, a non-magnetic conductor is provided in a rotor, and when an electronic coil of a stator provided to face the rotor is energized, the non-magnetic conductor in the rotor is affected by a magnetic flux to induce a current, and torque is generated to rotate. As a result, such a synchronous reluctance motor has characteristics of self-activation.

It should be noted that the foregoing introduction to the technical background is merely described for convenience of clearly and completely describing the technical contents of the present application and for ease of understanding by a person skilled in the art. The technical contents are described in the background of the present application, so that the above technical contents cannot be regarded as known to a person skilled in the art.

SUMMARY

However, the inventors of preferred embodiments of the present invention have discovered that performance and cost of a conventional synchronous reluctance motor are limited to some extent. For example, in some structures, a non-magnetic aluminum conductor is cast on an outer periphery of a rotor of a conventional induction motor to form a Line Start SynRM, but in such a Line Start SynRM, a flux barrier (a space in which the aluminum conductor is provided in the rotor) is too far from a main magnetic field of a stator and efficiency at rated power is poor. For example, in other structures, according to the Line Start SynRM of the above structure, instead of casting the non-magnetic aluminum conductor on the outer periphery of the rotor, an aluminum liquid is cast in a flux barrier extending in an axial direction of the rotor in the rotor. However, in the Line Start SynRM of the above structure, it is difficult to realize good performance such as self-starting performance, output efficiency, and rapid stability performance in a conventional arrangement manner of the flux barrier. For example, in other structures, a deep groove specially designed is provided in the rotor q-axis, the outer shape of the rotor core is formed into a gear shape, a conductive and non-magnetic material such as a copper wire is wound around a gear-shaped protruding portion of the rotor core, and a current is induced while a magnetic flux is passed through the rotor d-axis to generate a torque. In the Line Start SynRM having such a structure, the winding easily comes out of the rotor core, the motor fails, and the rotor core needs to adopt a design and a manufacturing process different from those of the conventional synchronous reluctance motor, which may cause an increase in manufacturing cost.

Examples of preferred embodiments of the present application provide rotors, motors, and electric products that each maintain output efficiency of a motor and improve starting load performance and rapid stability performance of the motor while suppressing an increase in cost.

According to a first example embodiment of the present application, there is provided a rotor which is on an outer periphery of a motor and is rotatable together with the rotation shaft. The rotor includes a rotor core made of a magnetic material, and flux barriers penetrating the rotor core along an axial direction. In a plane orthogonal to the axial direction, among a plurality of the flux barriers corresponding to each pole of the rotor, at least two of the flux barriers are entirely located within an extending angle with a magnitude of the extending angle being determined by a number of poles of the rotor and a number of phases of the motor. A center line of the extending angle is a q-axis of the rotor, a ratio between an area of the flux barrier entirely located within the extending angle and an area of all flux barriers corresponding to each pole is about ½ or more, and a ratio between a difference between an area of a radially innermost flux barrier entirely located within the extending angle and an area of a radially outermost flux barrier entirely located within the extending angle and a smaller one of the two areas is about 10% or less.

In one or more example embodiments of the present invention, the angular magnitude of the extending angle can be defined by the following Expression (1):

$$A=(360\times(\text{Phase}-1))/(\text{Pre}\times\text{Phase}) \quad (1)$$

where, A represents the angular magnitude of the extending angle, Phase represents the number of phases of the motor, and Pole represents the number of poles of the rotor.

In one or more example embodiments of the present invention, an area of a radially innermost flux barrier located entirely within the extending angle is equal to an area of a radially outermost flux barrier located entirely within the extending angle.

In one or more example embodiments of the present invention, a number of the flux barriers corresponding to each pole of the rotor is at least three.

In one or more example embodiments of the present invention, a number of the flux barriers corresponding to each pole of the rotor is four, and the rotor includes a first flux barrier, a second flux barrier, a third flux barrier, and a fourth flux barrier that are respectively provided from a radially outer side toward a radially inner side, the fourth flux barrier is located outside the extending angle, and the first flux barrier, the second flux barrier, and the third flux barrier are located within the extending angle.

In one or more example embodiments of the present invention, a number of the flux barriers corresponding to each pole of the rotor is four, and the rotor includes a first flux barrier, a second flux barrier, a third flux barrier and a fourth flux barrier that are respectively provided from a radially outer side toward a radially inner side, the third flux barrier and the fourth flux barrier are located outside the extending angle, and the first flux barrier and the second flux barrier are located within the extending angle.

In one or more example embodiments of the present invention, a number of the flux barriers corresponding to each pole of the rotor is six, and the rotor includes a first flux barrier, a second flux barrier, a third flux barrier, a fourth flux barrier, a fifth flux barrier and a sixth flux barrier that are respectively provided from a radially outer side toward a radially inner side, the fifth flux barrier and the sixth flux barrier are located outside the extending angle, and the first flux barrier, the second flux barrier, the third flux barrier, and the fourth flux barrier are located within the extending angle.

In one or more example embodiments of the present invention, a number of poles of the rotor is four, and the flux barriers corresponding to two adjacent poles are provided symmetrically with respect to a boundary line between the two adjacent poles.

In one or more example embodiments of the present invention, some or all of the flux barriers are filled with a non-magnetic conductive material.

According to a second example embodiment of the present invention, there is provided a motor including a rotation shaft extending along a center axis, the rotor according to the first example embodiment of the present invention that is provided on an outer periphery of the rotation shaft and is rotatable together with the rotation shaft, and a stator radially opposed to the rotor.

According to a third example embodiment of the present invention, there is provided an electric product including a motor as described in the second example embodiment of the present invention.

As one of beneficial effects of the example embodiments of the present application, among the plurality of flux barriers corresponding to each pole of the rotor of the motor, a ratio between an area of the flux barrier located entirely inside the extending angle and an area of all the flux barriers corresponding to each pole is about ½ or more, so that the motor has good output efficiency, and a ratio between a difference between an area of the radially innermost flux barrier located entirely inside the extending angle and an area of the radially outermost flux barrier located entirely inside the extending angle and a smaller one of the two areas is about 10% or less. The main torque can be supplied via the electromagnetic induction by the conductor in the radially outermost flux barrier located entirely within the extending angle during the self-starting, and the self-starting load capability can be improved, and when in the semi-synchronous interval (semi-synchronization state, i.e., motor synchronization state immediately becomes) after the self-starting, the main torque can be supplied via the electromagnetic induction by the conductor in the radially innermost flux barrier located entirely within the extending angle, so that the motor can pass through the semi-synchronous interval faster to achieve the stable state quickly. In the present application, by designing the distribution of the flux barrier of the rotor, the process is not different from the conventional technique, that is, in the present application, it is not necessary to increase the number of steps in the manufacturing process of the rotor with respect to the rotor manufactured by casting the conventional aluminum liquid into the flux barrier in the rotor, and the cost increase can be suppressed.

Example embodiments of the present application are disclosed in detail with reference to the following description and drawings. It should be understood that the example embodiments of the present application are not limited in scope. Within the scope of the spirit and terms of the appended claims, the example embodiments of the present application include many changes, modifications, and equivalents.

Features described and/or shown in one example embodiment can be used in the same or similar manner in one or more other example embodiments, combined with features in other example embodiments, or substituted for features in other example embodiments.

It should be emphasized that the term "include/included/have," when used in this text, refers to the presence of a feature, an entire member, or a member, but does not preclude the presence or addition of one or more other features, entire members, or members.

The above and other elements, features, steps, characteristics and advantages of the present disclosure will become more apparent from the following detailed description of the example embodiments with reference to the attached drawings.

BRIEF DESCRIPTION OF THE DRAWINGS

Hereinafter, with reference to the drawings, the above and other elements, features, and advantages of the example embodiments of the present application will become more apparent.

DETAILED DESCRIPTION

With reference to the drawings, the above and other features of the present application will be clarified by the following specification. In the specification and drawings, specific example embodiments of the present application are disclosed, and some example embodiments are shown in which the principles of the present application can be used. It should be understood not only that the present application is not limited to the example embodiments described herein, but also that the present application includes all amendments, modifications, and equivalents within the scope of the claims described.

In the example embodiments of this application, the terms, "and/or" and "and/alternatively" include any one and all combinations of one or more of terms associated and listed. The terms, "including", "comprising", "having", and the like, refer to presence of stated features, elements, devices, or assemblies, but do not preclude the presence/addition of one or more other features, elements, devices, or assemblies.

In the example embodiments of the present application, singular forms "a", "the", and the like are not to be limited to meaning of "one" but may include a plural form unless otherwise stated in context. Thus, the singular forms are to be understood in a broad sense as "present" or "one type", and the term, "the", is to be understood to include both the singular form and the plural form. Unless otherwise stated in context, the term, "based on", should be understood as "at least partly based on", and the term, "on the basis of", should be understood as "at least partly on the basis of".

In the following description of example embodiments of the present application, for ease of explanation, a direction extending along the center axis of a motor or a direction parallel thereto is referred to as an "axial direction", a radial direction centered on the axial direction is referred to as a "radial direction", and a direction surrounding the axial direction is referred to as a "circumferential direction". It should be noted that any of the foregoing is merely for convenience of description and is not intended to limit a direction of the rotor and the motor at the time of use and manufacturing.

Hereinafter, the example embodiments of the present application will be described with reference to the drawings.

Example of First Aspect

An example of a first aspect of the present application provides a rotor.

Figure 1:
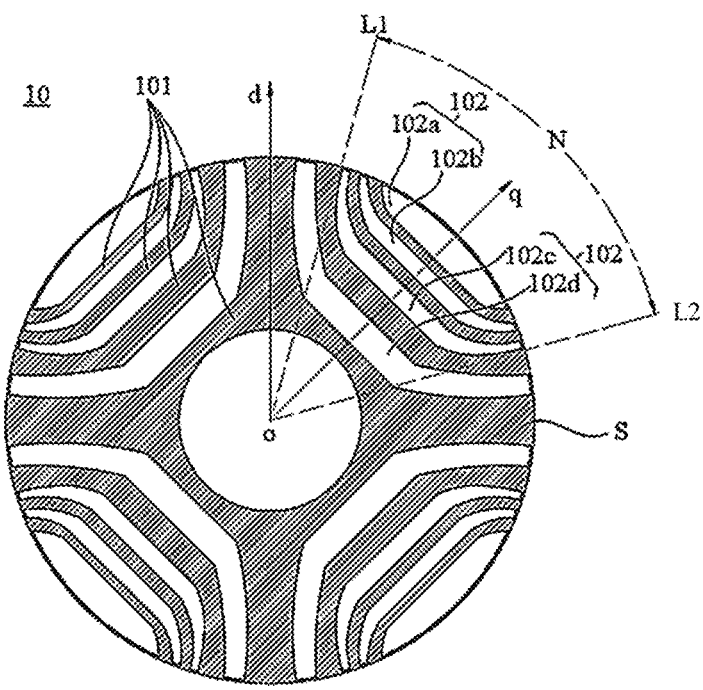
FIG. 1 is one schematic view of a rotor according to an example of a first preferred embodiment of the present application.

FIG. 1 is one schematic view of a rotor according to the example of the first aspect of the present application, and is a cross-sectional view illustrating the rotor cut along a plane perpendicular to an axial direction (a direction perpendicular to a paper surface) of the rotor. In the example of the present application, the rotor is provided on the outer periphery of the rotation shaft of the motor and rotates together with the rotation shaft.

As illustrated in FIG. 1, a rotor 10 includes a rotor core 101 made of a magnetic material and a plurality of flux barriers 102 penetrating the rotor core 101 along the axial direction.

In one or more examples, as illustrated in FIG. 1, in a plane S orthogonal to the axial direction, among the plurality of flux barriers 102 (102a, 102b, 102c, 102d) corresponding to each pole of the rotor 10, the entirety of three flux barriers 102a, 102b, and 102c are located within an extending angle N. The magnitude of the extending angle N is determined by the number of poles of the rotor 10 and the number of phases of the motor. The center line of the extending angle N is the q axis of the rotor 10. The ratio of the area of the flux barriers 102a, 102b, and 102c within inside the extending angle N to the area of all the flux barriers 102a, 102b, 102c, and 102d corresponding to each pole is ½ or more. The ratio between the difference between the area of the radially innermost flux barrier 102c entirely located within the extending angle and the area of the radially outermost flux barrier 102a entirely located within the extending angle and the smaller one of these two areas is 10% or less.

However, this application is not limited thereto, and the number of the plurality of flux barriers 102 corresponding to each pole of the rotor 10 may be, for example, other numerical values such as 2, 3, 5, 6, and 6 or more. This application is not limited thereto, and a person skilled in the art may determine according to actual needs and actual situations such as process permissions. Also, for the plurality of flux barriers 102 for each pole of the rotor 10, the number of flux barriers entirely located within the extending angle N may be other numerical values, e.g., 2, 4, 5, etc., which the present application does not limit, and those skilled in the art can determine according to actual circumstances.

As can be seen from the above example, in the plurality of flux barriers 102 corresponding to each pole of the rotor 10 in the plane S orthogonal to the axial direction, the entirety of at least two flux barriers are located within the extending angle N, the magnitude of the extending angle N is determined by the number of poles of the rotor 10 and the number of phases of the motor, the center line of the extending angle N is the q-axis of the rotor 10, and the ratio of the area of the flux barrier located within the extending angle N and the area of all the flux barriers corresponding to each pole is greater than or equal to ½. Thus, it is possible to ensure that the motor has good output efficiency by ensuring the area of the flux barrier in the region of the extending angle N that is severely affected by the magnetic field. The ratio of the difference between the area of the radially innermost flux barrier located entirely within the extending angle and the area of the radially outermost flux barrier located entirely within the extending angle to the smaller one of these two areas is less than or equal to 10%. At the time of self-starting, the main torque can be supplied via electromagnetic induction by the conductor in the radially outermost flux barrier located entirely within the extending angle, and the self-starting load capability can be improved. When in the semi-synchronous interval (semi-synchronization state, i.e., motor synchronization state immediately becomes) after the self-starting, the conductor (for example, a conductor in the radially outermost flux barrier located within the extending angle) of the rotor surface layer gradually loses its main induction due to a decrease in a magnetic flux change frequency with a rotation difference. Conversely, the main torque is supplied via electromagnetic induction by the conductor in the radially innermost flux barrier located entirely within the extending angle, so that the retraction torque of the motor can be increased, and the motor can be caused to pass through the semi-synchronous interval faster. Therefore, a stable state can be achieved quickly, and for the retraction torque characteristic, reference may be made to the related art, and detailed description is omitted herein. In the present application, by designing the distribution of the flux barrier of the rotor, the process is not different from the conventional technique, that is, in the present application, it is not necessary to increase the number of steps in the manufacturing process of the rotor with respect to the rotor manufactured by casting the conventional aluminum liquid into the flux barrier in the rotor, and the cost increase can be suppressed.

In the example of the present application, as illustrated in FIG. 1, the extending angle N is an angle of which the angular magnitude is determined by the number of poles of the rotor 10 and the number of phases of the motor with the center O of the rotor 10 on the plane S as a vertex and the q-axis of the rotor passing through the center O as a bisector. Here, in the synchronous motor, since the number of poles of the rotor and the number of poles of the stator are the same, the angular magnitude of the extending angle can also be determined by the number of poles of the stator and the number of phases of the motor. The q-axis, the number of stator poles, the number of rotor poles, and the number of phases of the motor can be referred to the related art, and a detailed description thereof is omitted here.

In one or more examples, the angular magnitude of the extending angle N can be calculated by the following Expression (1):

$$A = (360 \times (\text{Phase}-1))/(\text{Pre} \times \text{Phase}) \quad (1)$$

where, A represents the angular magnitude of the extending angle N, Phase represents the number of phases of the motor, and Pole represents the number of poles of the rotor.

For example, when the number of rotor poles is 4 and the number of motor phases is 3, A, which is the angular magnitude of the extending angle N calculated by the above Expression (1), is 60 degrees. Then, with the center O as a vertex and the q-axis of the rotor passing through the center O as a bisector, the entirety of at least two flux barriers among the plurality of flux barriers corresponding to one pole of the rotor is located within one extending angle within the extending angle having an angular magnitude of 60 degrees. In the example of the present application, as illustrated in FIG. 1, the fact that the entire flux barrier is located within the extending angle indicates that the region occupied by the flux barrier in the plane S is located in the region between the two sides L1 and L2 of the extending angle N.

However, the present application is not limited thereto, and the angular magnitude of the extending angle N may be slightly smaller or slightly larger than the angle value calculated by the above Expression (1) as long as the region corresponding to the extending angle N is the main flow region of the magnetic flux. In other words, in the region corresponding to the extending angle N of the rotor, the influence of the magnetic flux due to the energization of the stator winding is large, the inducible electromagnetic torque is relatively high, and the self-starting ability of the motor is greatly affected.

In the example of the present application, the specific shape of the flux barrier is not limited, and may be any shape as long as the area of each flux barrier satisfies the above condition.

In one or more examples, as illustrated in FIG. 1, the area of the radially innermost flux barrier 102c entirely located within the extending angle N may be equal to the area of the radially outermost flux barrier 102a located within the extending angle N. However, the present disclosure is not limited thereto, and the flux barrier 102c and the flux barrier 102a may be different from each other, and there may be a small difference therebetween in consideration of difficulty in a manufacturing process for equally securing areas of the flux barrier 102c and the flux barrier 102a.

In one or more examples, the number of flux barriers corresponding to each pole of the rotor is at least three, at least three flux barriers are provided one by one from the radially outer side toward the radially inner side, the respective flux barriers are provided spaced from each other, at least one flux barrier provided inside is located outside the extending angle, and the entirety of at least two flux barriers provided outside is located within the extending angle.

For example, FIG. 1 shows a case where the number of flux barriers corresponding to each pole of the rotor 10 is four, and the four flux barriers are provided from the radially outer side toward the radially inner side, one flux barrier 102d provided on the radially inner side is located outside the extending angle N, and the entirety of the three flux barriers 102a, 102b, and 102c provided on the radially outer side of the flux barrier 102d is located within the extending angle.

In the example of the present application, the fact that the flux barrier is located outside the extending angle indicates that at least a part of the flux barrier is located outside the extending angle, that is, the entire flux barrier is not located within the extending angle.

Figure 2:
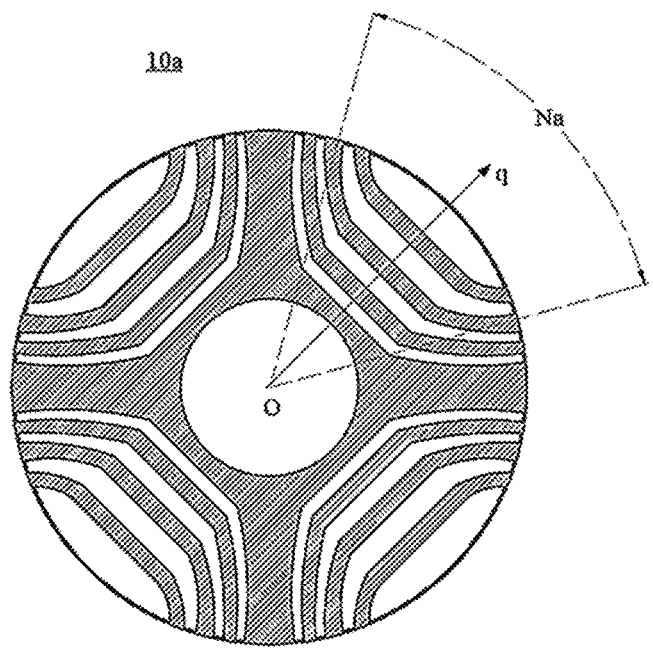
FIG. 2 is another schematic view of the rotor according to the example of the first preferred embodiment of the present application.

When the number of flux barriers corresponding to each pole of the rotor 10 is four, the arrangement of the flux barriers with respect to the extending angle is not limited to the situation illustrated in FIG. 1, and may be other situations. For example, FIG. 2 is another schematic view of a rotor 10a according to the example of the first aspect of the present application. As illustrated in FIG. 2, the four flux barriers are provided from the radially outer side toward the radially inner side, the two flux barriers provided on the radially inner side are located outside an extending angle Na, and the entire two flux barriers provided on the radially inner side are located within the extending angle Na. In this case, two small radial dimension flux barriers provided on the radially inner side can be merged into one flux barrier located outside the extending angle Na, the merged flux barrier having a large radial dimension, preventing the rotor 10a from being destroyed by the high-pressure aluminum liquid in the manufacturing process, which is advantageous for the manufacture of the rotor 10a.

Figure 3:
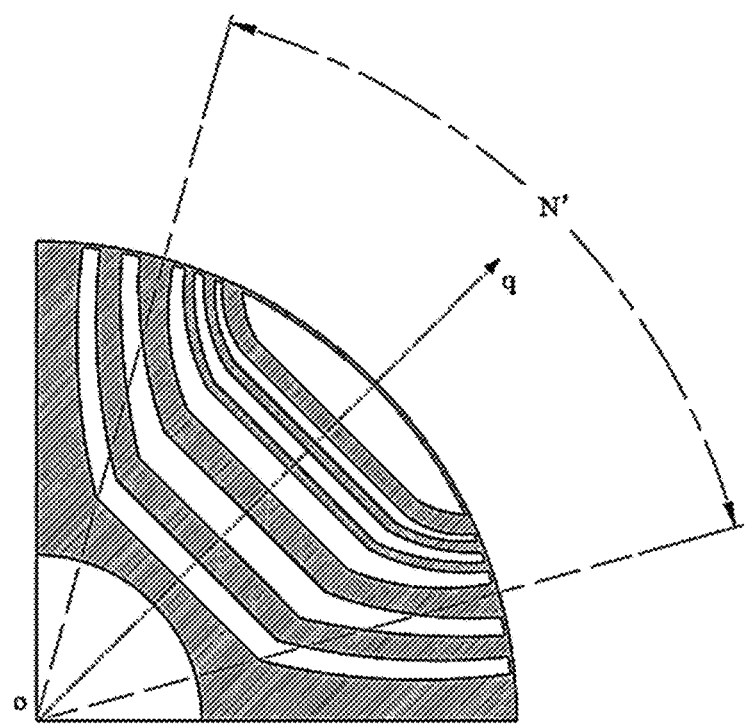
FIG. 3 is still another schematic view of the rotor according to the example of the first preferred embodiment of the present application.

For example, FIG. 3 is still another schematic view of a rotor according to an example of the first aspect of the present application, and shows a situation of one pole of another example embodiment of the rotor. As illustrated in FIG. 3, the number of flux barriers corresponding to one pole of the rotor is six provided from the radially outer side toward the radially inner side, two flux barriers located radially inside are located outside an extending angle N', and four flux barriers located radially outside are located within the extending angle N'. However, FIG. 3 is merely an exemplary description, and the number of flux barriers located outside the extending angle N' may be one, and the number of flux barriers located entirely within the extending angle N' may be five, three, or two, and a person skilled in the art may set according to an actual situation.

In the example of the present application, as illustrated in FIGS. 1 and 2, the numbers of poles of the rotor 10 and the rotor 10a are both 4, and the flux barriers corresponding to two adjacent poles are provided symmetrically with respect to a boundary line between the two adjacent poles. For example, as illustrated in FIG. 1, the flux barriers corresponding to two adjacent poles on both sides of the q axis are provided symmetrically with respect to the boundary line d axis of the two poles, whereby the stability of the motor during operation can be secured.

FIGS. 1 and 2 illustrate a case where the number of poles of the rotor is four, but the present application is not limited thereto, the number of poles of the rotor may be, for example, other numerical values such as 2, 6, and 8, and a person skilled in the art can select a rotor having a specific number of poles according to an actual situation.

Figure 4:
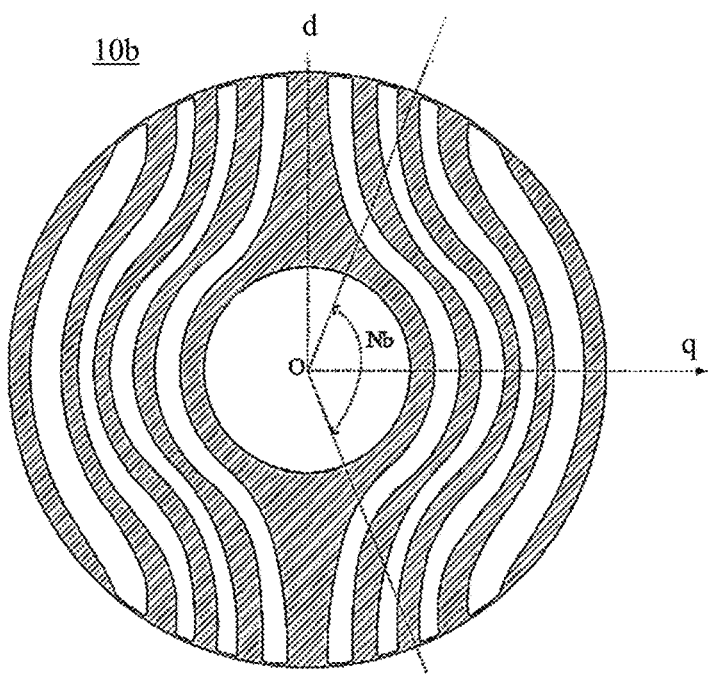
FIG. 4 is still another schematic view of the rotor according to the example of the first preferred embodiment of the present application.

For example, FIG. 4 is still another schematic view of a rotor 10b according to the example of the first aspect of the present application, and illustrates a case where the number of poles of the rotor 10b is 2. As illustrated in FIG. 4, a flux barrier corresponding to two adjacent poles on both sides of the d axis is provided symmetrically with respect to a boundary line d axis of the two poles. Four flux barriers are provided corresponding to each pole, wherein the entirety of the two flux barriers are located within the extending angle Nb and a part of the other two flux barriers are located outside the extending angle Nb.

Figure 5:
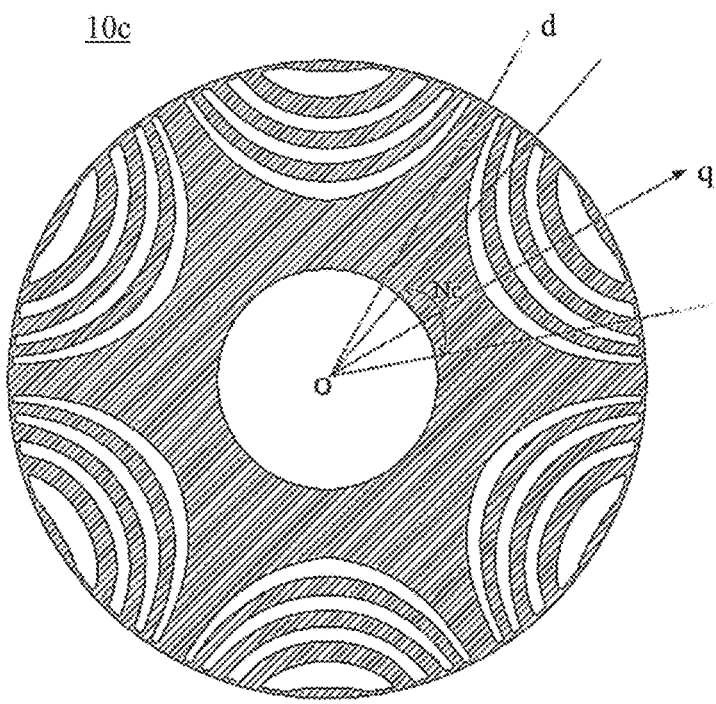
FIG. 5 is still another schematic view of the rotor according to the example of the first preferred embodiment of the present application.

FIG. 5 is still another schematic view of a rotor 10c according to the example of the first aspect of the present application, and illustrates a case where the number of poles of the rotor 10c is 6. As illustrated in FIG. 5, a flux barrier corresponding to two adjacent poles on both sides of the d axis is provided symmetrically with respect to a boundary line d axis of the two poles. Four flux barriers are provided corresponding to each pole, wherein the entirety of the two flux barriers are located within an extending angle Nc and a part of the other two flux barriers are located outside the extending angle Nc.

In one or more examples, some or all of the plurality of flux barriers are filled with a non-magnetic conductive material.

In the examples of the present application, a person skilled in the art can determine which flux barrier to fill with the non-magnetic conductive material depending on actual needs or manufacturing difficulty.

For example, the interior of all of the plurality of flux barriers can be filled with a non-magnetic conductive material, thereby effectively improving the loading capacity of the motor.

For example, a non-magnetic conductive material can be filled inside the flux barrier entirely located within the extending angle, and a non-magnetic conductive material is not filled in the flux barrier located outside the extending angle, or a non-magnetic conductive material is filled in a part of the space, so that a part of the flux barrier can be brought into a hollow state in the axial direction, whereby the difficulty in manufacturing the flux barrier to be filled with a non-magnetic conductive material can be reduced.

In the example of the present application, the non-magnetic conductive material may be a copper material (for example, a copper liquid) or an aluminum material (for example, an aluminum liquid), but is not limited thereto, and may be other non-magnetic conductive materials, and the present application does not limit this, and a person skilled in the art can select the material according to an actual situation.

According to the example of the present application, among the plurality of flux barriers corresponding to each pole of the rotor of the motor, the ratio of the area of the flux barrier located entirely within the extending angle to the area of all the flux barriers corresponding to each pole is greater than or equal to ½, so that the motor has a good output efficiency, and during self-starting, the main torque can be supplied via electromagnetic induction by the conductor at the radially outermost flux barrier located entirely within the extending angle, and the self-starting load capability can be improved, and when in the semi-synchronous interval (semi-synchronization state, i.e., motor synchronization state immediately becomes) after the self-starting, the main torque can be supplied via electromagnetic induction by the conductor at the radially innermost flux barrier located entirely within the extending angle, so that the motor can pass through the semi-synchronous interval quickly, achieving a stable state quickly. In the present application, by designing the distribution of the flux barrier of the rotor, the process is not different from the conventional technique, that is, in the present application, it is not necessary to increase the number of steps in the manufacturing process of the rotor with respect to the rotor manufactured by casting the conventional aluminum liquid into the flux barrier in the rotor, and the cost increase can be suppressed.

Example of Second Aspect

Figure 6:
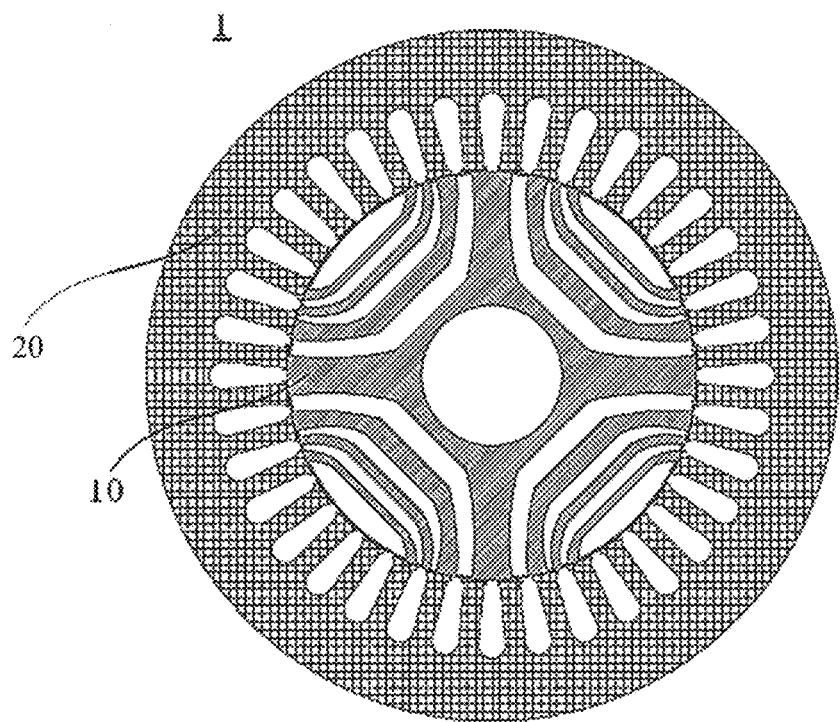
FIG. 6 is one schematic view of a rotor according to an example of a second preferred embodiment of the present application.

An example of the second aspect of the present application provides a motor, and FIG. 6 is one schematic view of the motor according to the example of the second aspect of the present application. As illustrated in FIG. 6, a motor 1 includes a rotation shaft extending along a center axis, a rotor 10 described in the example of the first aspect, and a stator 20. The rotor 10 is provided on an outer periphery of the rotation shaft and rotates together with the rotation shaft. The stator 20 radially faces the rotor 10. The rotor in the motor 1 may be any other rotor such as 10a, 10b, or 10c described in the example of the first aspect.

In the example of the present application, the motor 1 may be a synchronous reluctance motor and another reluctance related motor, and includes, for example, a Line Start SynRM.

Although only the structure of the motor according to the example of the present application has been described above, the related art can be referred to for other configurations of the motor, and a detailed description thereof will be omitted here.

According to the example of the present application, among the plurality of flux barriers corresponding to each pole of the rotor of the motor, the ratio of the area of the flux barrier located entirely within the extending angle to the area of all the flux barriers corresponding to each pole is greater than or equal to ½, so that the motor has a good output efficiency, and during self-starting, the main torque can be supplied via electromagnetic induction by the conductor in the radially outermost flux barrier located entirely within the extending angle, and the self-starting load capability can be improved, and when in the semi-synchronous interval (semi-synchronization state, i.e., motor synchronization state immediately becomes) after the self-starting, the main torque can be supplied via electromagnetic induction by the conductor in the radially innermost flux barrier located entirely within the extending angle, so that the motor can pass through the semi-synchronous interval quickly, achieving a stable state quickly. In the present application, by designing the distribution of the flux barrier of the rotor, the process is not different from the conventional technique, that is, in the present application, it is not necessary to increase the number of steps in the manufacturing process of the rotor with respect to the rotor manufactured by casting the conventional aluminum liquid into the flux barrier in the rotor, and the cost increase can be suppressed.

The motor according to the example of the present application can effectively improve the self-starting performance of the synchronous reluctance motor, increase the application range and application environment of the motor, for example, can be applied to an environment with a high inertia moment and a high initial load, and can be quickly operated in a stable state in this application environment.

Example of Third Aspect

An example of the third aspect of the present application provides an electric product having a motor as described in the example of the second aspect. In the example of the second aspect, the structure of the motor will be described in detail, the contents thereof are incorporated herein, and the detailed description thereof will be omitted here.

In the example of the present application, the electric product may be any electric device provided with a motor, and may be, for example, household electric appliances such as an indoor unit of an air conditioner, an outdoor unit of an air conditioner, a water server, a washing machine, a vacuum cleaner, a compressor, a blower, and a stirrer, or industrial equipment such as a pump, a conveyor, an elevator, a standard industrial machine, a wind power generator, a grinding machine, and a traction motor, or various information processing equipment. Further, the electric product may be each component of an automobile, for example, an automobile electric power steering system or an electric bicycle drive system.

According to the example of the present application, the motor has a good output efficiency, can supply the main torque via the electromagnetic induction by the conductor in the radially outermost flux barrier located entirely within the extending angle during the self-starting, and can improve the self-starting load capability, and when in the semi-synchronous interval (semi-synchronization state, i.e., motor synchronization state immediately becomes) after the self-starting, can supply the main torque via the electromagnetic induction by the conductor in the radially innermost flux barrier located entirely within the extending angle, so that the motor can pass through the semi-synchronous interval faster, thereby realizing the stable state quickly. In the present application, it is not necessary to increase the number of steps in the manufacturing process of the rotor, and it is possible to suppress an increase in cost.

Although the example of the present application has been described only as an example, the example of the present application is not limited thereto, and appropriate modifications can be made in addition to the above example embodiments. Although only the exemplary description has been made for each member in the above description, the example of the present application is not limited thereto, and the specific content of each member may refer to the related art. It is also possible to add members not shown in the drawings or to reduce one or more members in the drawings.

Although the examples of the present application have been described above by combining specific example embodiments, it should be understood by those skilled in the art that these descriptions are exemplary and not restrictive of the claims of the examples of the present application. A person skilled in the art may make various modifications and corrections to the examples of this application based on the idea and principle of the examples of this application, and these modifications and corrections are also within the scope of the examples of this application.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotation shaft extending along a center axis;
a rotor provided on an outer periphery of the rotation shaft and rotatable together with the rotation shaft; and
a stator radially opposed to the rotor; wherein
the rotor includes a rotor core made of a magnetic material;
the rotor includes flux barriers penetrating the rotor core along an axial direction;
in a plane orthogonal to the axial direction, among a plurality of the flux barriers corresponding to each pole of the rotor, at least two of the flux barriers are entirely located within an extending angle, a magnitude of the extending angle is determined by a number of poles of the rotor and a number of phases of the motor, a center line of the extending angle is a q-axis of the rotor, a ratio between an area of the flux barriers entirely located within the extending angle and an area of all flux barriers corresponding to each pole is about ½ or more, and a ratio between a difference between an area of a radially innermost flux barrier entirely located within the extending angle and an area of a radially outermost flux barrier entirely located within the extending angle and a smaller one of the two areas is about 10% or less.

2. The motor according to claim 1, wherein
an angular magnitude of the extending angle is defined by:

$A=(360\times(\text{Phase}-1))/(\text{Pre}\times\text{Phase})$ where A represents an angular magnitude of the extending angle, Phase represents the number of phases of the motor, and Pole represents the number of poles of the rotor.

3. The motor according to claim 2, wherein
a total number of poles of the rotor is four, and the flux barriers corresponding to two adjacent poles are provided symmetrically with respect to a boundary line between the two adjacent poles; and
some or all of a plurality of the flux barriers are filled with a non-magnetic conductive material.

4. The motor according to claim 1, wherein an area of a radially innermost flux barrier entirely located within the extending angle is equal or substantially equal to an area of a radially outermost flux barrier entirely located within the extending angle.

5. The motor according to claim 1, wherein a number of the flux barriers corresponding to each pole of the rotor is at least three.

6. The motor according to claim 5, wherein a total number of the flux barriers corresponding to each pole of the rotor is four, and the rotor includes a first flux barrier, a second flux barrier, a third flux barrier and a fourth flux barrier that are respectively provided from a radially outer side toward a radially inner side, the fourth flux barrier is located outside the extending angle, and the first flux barrier, the second flux barrier, and the third flux barrier are located within the extending angle.

7. An electric product comprising
the motor according to claim 6.

8. The motor according to claim 5, wherein
an angular magnitude of the extending angle is defined by:

$A=(360\times(\text{Phase}-1))/(\text{Pre}\times\text{Phase})$ where A represents an angular magnitude of the extending angle, Phase represents the number of phases of the motor, and Pole represents the number of poles of the rotor; and
a total number of the flux barriers corresponding to each pole of the rotor is four, and the rotor includes a first flux barrier, a second flux barrier, a third flux barrier and a fourth flux barrier that are respectively provided from a radially outer side toward a radially inner side, the fourth flux barrier is located outside the extending angle, and the first flux barrier, the second flux barrier, and the third flux barrier are located within the extending angle.

9. The motor according to claim 8, wherein some or all of a plurality of the flux barriers are filled with a non-magnetic conductive material.

10. The motor according to claim 5, wherein a number of the flux barriers corresponding to each pole of the rotor is four, and the rotor includes a first flux barrier, a second flux barrier, a third flux barrier and a fourth flux barrier that are respectively provided from a radially outer side toward a radially inner side, the third flux barrier and the fourth flux barrier are located outside the extending angle, and the first flux barrier and the second flux barrier are located within the extending angle.

11. The motor according to claim 5, wherein
an angular magnitude of the extending angle is defined by:

$$A=(360\times(\text{Phase}-1))/(\text{Pre}\times\text{Phase})$$

where A represents an angular magnitude of the extending angle, Phase represents the number of phases of the motor, and Pole represents the number of poles of the rotor; and
a total number of the flux barriers corresponding to each pole of the rotor is four, and the rotor includes a first flux barrier, a second flux barrier, a third flux barrier and a fourth flux barrier that are respectively provided from a radially outer side toward a radially inner side, the third flux barrier and the fourth flux barrier are located outside the extending angle, and the first flux barrier and the second flux barrier are located within the extending angle.

12. The motor according to claim 11, wherein some or all of a plurality of the flux barriers are filled with a non-magnetic conductive material.

13. The motor according to claim 5, wherein a total number of the flux barriers corresponding to each pole of the rotor is six, and the rotor includes a first flux barrier, a second flux barrier, a third flux barrier, a fourth flux barrier, a fifth flux barrier and a sixth flux barrier that are respectively provided from a radially outer side toward a radially inner side, the fifth flux barrier and the sixth flux barrier are located outside the extending angle, and the first flux barrier, the second flux barrier, the third flux barrier, and the fourth flux barrier are located within the extending angle.

14. The motor according to claim 5, wherein
an angular magnitude of the extending angle is defined by:

$$A=(360\times(\text{Phase}-1))/(\text{Pre}\times\text{Phase})$$

where A represents an angular magnitude of the extending angle, Phase represents the number of phases of the motor, and Pole represents the number of poles of the rotor; and
a total number of the flux barriers corresponding to each pole of the rotor is six, and the rotor includes a first flux barrier, a second flux barrier, a third flux barrier, a fourth flux barrier, a fifth flux barrier and a sixth flux barrier that are respectively provided from a radially outer side toward a radially inner side, the fifth flux barrier and the sixth flux barrier are located outside the extending angle, and the first flux barrier, the second flux barrier, the third flux barrier, and the fourth flux barrier are located within the extending angle.

15. The motor according to claim 14, wherein some or all of a plurality of the flux barriers are filled with a non-magnetic conductive material.

16. The motor according to claim 1, wherein
a total number of poles of the rotor is four, and the flux barriers corresponding to two adjacent poles are provided symmetrically with respect to a boundary line between the two adjacent poles; and
some or all of a plurality of the flux barriers are filled with a non-magnetic conductive material.

* * * * *